United States Patent [19]

Lederer

[11] 3,995,524
[45] Dec. 7, 1976

[54] AUTOMATIC LOADING APPARATUS FOR DOUBLE-SPINDLE FACE LATHES

[75] Inventor: Gerhard Lederer, Saint Georgen, Germany

[73] Assignee: J. G. Weisser Sohne, St. Georgen, Germany

[22] Filed: Dec. 10, 1975

[21] Appl. No.: 639,365

[30] Foreign Application Priority Data

Dec. 12, 1974 Germany .................. 2458760

[52] U.S. Cl. ................................................ 82/2.7
[51] Int. Cl.[2] ......................................... B23B 13/00
[58] Field of Search ................ 82/2.5, 2.7, 38 R

[56] References Cited
UNITED STATES PATENTS

| | | | |
|---|---|---|---|
| 3,200,472 | 8/1965 | Kohring et al. ................... | 82/2.7 |
| 3,707,101 | 12/1972 | Werth ................................ | 82/2.7 |
| 3,803,955 | 4/1974 | Walk ................................. | 82/2.5 |

Primary Examiner—Harrison L. Hinson
Attorney, Agent, or Firm—Lackenbach, Lilling & Siegel

[57] ABSTRACT

An automatic loading apparatus for double-spindle face lathes having four machining slides, and having a workpiece feed chute for the blank parts and a workpiece discharge chute for the finished parts, wherein a magazine device bracket is rigidly attached, to a lathe having a substantially vertical guideway, by a loading carriage slidable on said guideway and by a loading spider which is mounted on the loading carriage with sliding mobility in the direction of its median axis and with 90° pivoting mobility about said axis. The device also exhibits workpiece grippers on each of its four arms, while depending upon the pivotal position of the loading spider, the one or the other pair of mutually opposite workpiece grippers are aligned with the spindles when the loading carriage is transported downwards, and are aligned with a removal aperture of the workpiece feed chute and with a surrender aperture of the workpiece discharge chute when the loading carriage is transported upwards.

10 Claims, 16 Drawing Figures

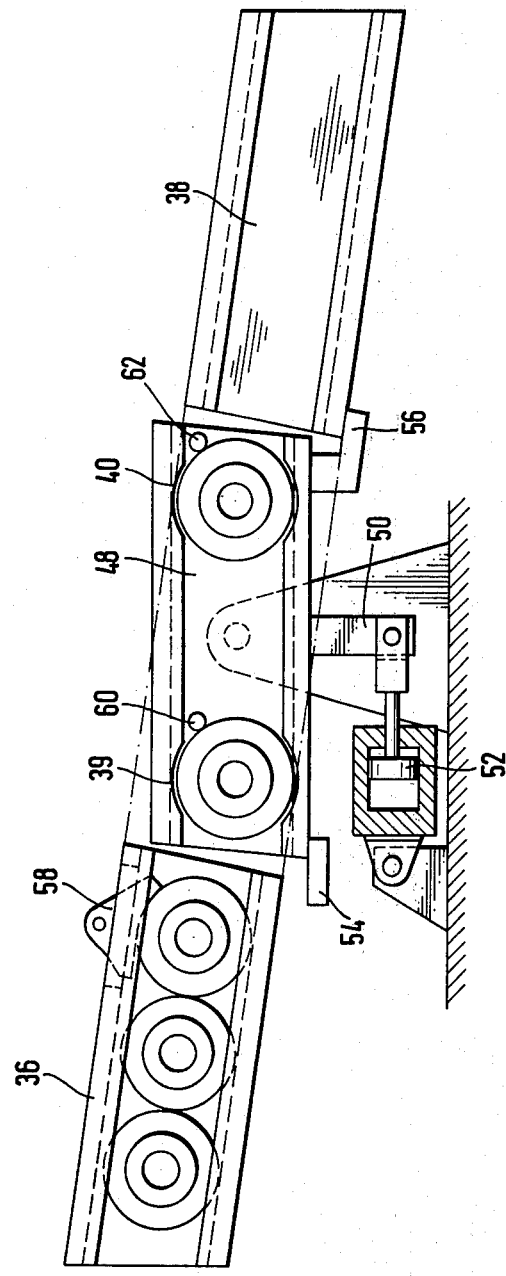

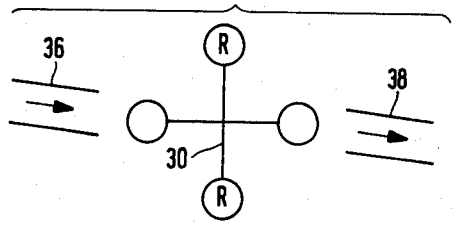
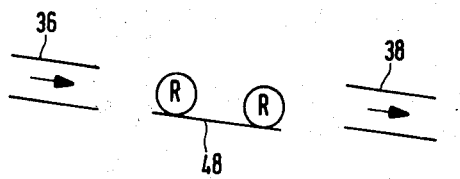
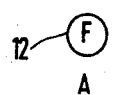 
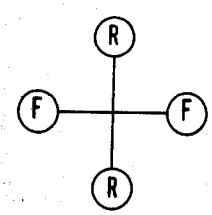
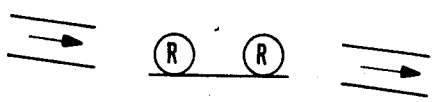
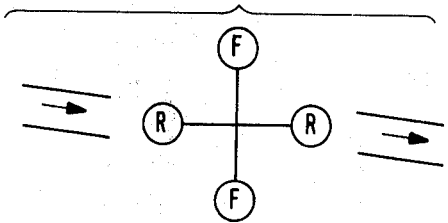
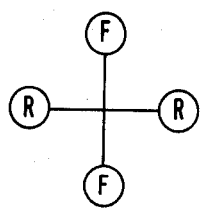
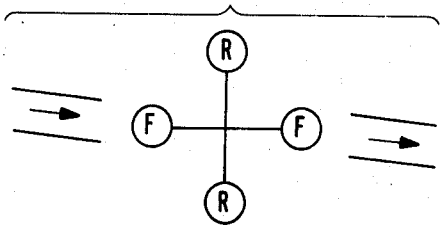

AUTOMATIC LOADING APPARATUS FOR DOUBLE-SPINDLE FACE LATHES

The invention relates to an automatic loading apparatus for double-spindle face lathes with four machining slides, with a workpiece feed chute for the blank parts and with a workpiece feed chute for the blank parts and with a workpiece dicharge chute for the finished parts.

The use of double-spindle face lathes has one preference over single-spindle lathes in many fields, because double-spindle lathes possess numerous advantages. The space requirements and the costs of a double-spindle lathe are smaller then those of two single-spindle lathes. Furthermore a higher output can be achieved with a double-spindle lathe. Double-spindle lathes with four machining slides, i.e. with one lower and one upper machining slide for each spindle, are particularly versatile in their machining scope.

The disadvantage of these double-spindle face lathes with four machining slides was hitherto principally that these machines were only suitable for manual loading. Fully automatic loading was impossible from space considerations, because the upper machining slides obstructed the attachment of a loading apparatus.

An automatic loading apparatus for a double-spindle lathe was recently proposed, wherein the workpieces are raised above the machine by an elevator and are fed to the loading apparatus from above. The loading apparatus has four pivotal arms by which the workpieces to be machined are first removed from the feed chute coming from above and are fed to the first spindle, they are then transported by the second arm from this spindle to a turning station located beneath the loading apparatus, they are moved by the third arm from this turning station to the second machining spindle, and are finally transported by the fourth arm from the second spindle to the discharge chute which is likewise arranged overhead. The feeding of the workpieces from above by means of the elevator produces a disadvantageous long overall height of the loading apparatus. Furthermore the feeding with the aid of the elevator is an additional source of failure for the automatic cycle of the loading. Another substantial disadvantage lies in the fact that not only the loading apparatus itself, but more particularly also the turning station, are located in the swarf region of the machining spindles. In view of the large quantities of swarf produced, this leads to rapid fouling which impairs the functions of the loading apparatus and of the turning station, or even makes it totally impossible.

The underlying aim of the invention is to produce an automatic loading apparatus for double-spindle face lathes with four machining slides which is of simple and stable construction, which does not increase the space requirements of the lathe and more particularly its overall height, which is itself located outside the swarf region of the machining spindles, and which also permits the arrangement of a turning station outside this swarf region.

This aim is achieved according to the invention in the case of an automatic loading apparatus of the type initially defined, by a magazine device bracket fastened rigidly to the lathe and having a substantially vertical guideway, by a loading carriage slidable on this guideway and by a loading spider which is attached to the loading carriage with sliding mobility in the direction of its median axis and with pivoting mobility through 90° about this axis and exhibits workpiece grippers on each of its four arms, whilst depending upon the pivotal position of the loading spider the one or the other pair of mutually opposite workpiece grippers are aligned with these spindles when the loading carriage is transported downwards, and with a removal aperture of the workpiece feed chute or with a discharge aperture of the workpiece discharge chute when the loading cariage is transported upwards.

The loading apparatus according to the invention is of simple and extremely stable construction. The loading spider can be operated by a lifting and pivoting drive which is attached rigidly to the loading carriage. The latter in turn runs very stably after the fashion of a slide bracket on the guideway of the magazine device bracket which is attached rigidly to the lathe frame. The loading apparatus according to the invention produces practically no increase in the space requirements for the lathe, and more particularly does not project upwards beyond the lathe and permits lateral feeding and discharging of the workpieces. The loading spider according to the invention transports the workpieces from the feed chute downwards to the machining spindles and from the latter back up to the discharge chute. The loading spider and hence the entire loading apparatus is therefore located in the swarf region of the spindles only during the loading of the chuck of the machining spindles, but not during the machining of the workpieces. Fouling of the loading apparatus by the swarf and impairment of the function of this loading apparatus are therefore eliminated.

In a particularly advantageous embodiment of the invention the magazine device bracket is inclined with reference to a plane extending at right angles to the lathe spindles so that it has the same distance from the chucks of the lathe spindles and from the removal and surrender apertures of the feed and discharge chutes. Because, due to the space requirement of the upper machining slides, the feed chute and the discharge chute cannot be placed in the same vertical plane in which the chucks of the spindles are located, in the case of a precisely vertical guiding of the loading carriage a different axial stroke of the loading spider would be necessary during the removal or surrender of the workpieces from the feed chute or into the discharge chute and during the loading of the chucks of the machining spindles in the lower position of the loading carriage. The oblique positioning of the magazine device bracket has the result that not only the removal and the surrender in the top position of the loading carriage, but also the loading of the sindle chucks in the bottom position, can be performed with the same axial stroke of the loading spider. This results in a considerable reduction of the mechanical outlay and of the outlay for control means.

It is also convenient that the loading carriage is slidable by means of a tandem stroke cylinder on the circular guides fastened to the magazine device bracket. The slidng on two circular guides provides particularly accurate and stable guidance of the loading carriage, while the use of a tandem stroke cylinder for the vertical up and down movement of the loading carriage achieves an additional reduction of the overall height.

If each workpiece is required to be machined consecutively on the two spindles at its two ends, then according to a further development of the invention a turning station is provided for gripping the workpieces and turning them through 180° in a position which corresponds to the position of the workpiece gripper of the vertically upstanding arm of the loading spider in its top position. The turning station in this embodiment is therefore located above the top limit position of the loading spider and therefore likewise above the machining spindles and outside the swarf region through 180° by the turning station, but is merely held firmly, then it is also possible with this embodiment of the invention to machine the same end of the workpiece consecutively both on the first and also on the second spindle.

However, if the double-spindle lathe is intended to be used to perform the same machining operaion with both spindles on two parallel juxtaposed workpieces, then according to another further development of the invention the workpiece removal and the workpiece surrender apertures are located in a workpiece seesaw which is tiltable into a horizontal position and into an oblique position connecting the feed chute and the discharge chute, and a singling device for the fed workpieces is provided in the feed chute, and a controllable bolt blocking the workpiece movement is arranged downstream of each of the removal and surrender apertures in the direction of travel of the workpieces. In this embodiment two workpieces are fed to the workpiece seesaw, which are simultaneously gripped by the loading spider and fed to the spindles. In similar manner the machined workpieces are removed simultaneously by the loading spider from the chucks of the spindles and deposited upon the workpiece seesaw from where they are fed to the discharge chute.

The loading apparatus according to the invention can therefore be used in a simple manner, both for the consecutive machining of one workpiece on both spindles with or without turning of the workpiece during the transfer from the first spindle to the second, and also for the parallel machining of two workpieces in the two spindles. Because the loading apparatus is the same for both types of use and it is only necessary to exchange the turning station for the workpiece seesaw, conversion from the one mode of operation to the other can also be accomplished in a simple way and at low costs.

The conversion of the loading apparatus to different workpiece dimensions is also simple to perform, because it only necessitates the exchange of the loading spider. In the case of the known machine, on the other hand, it is necessary to exchange the four arms individually, which occupies a considerably longer time.

The loading apparatus according to the invention and its mode of operation are more fully explained hereinbelow by exemplary embodiments and with reference to the accompanying drawing, wherein:

FIG. 6 shows a workpiece seesaw such as may be used in the loading apparatus instead of the turning station of FIGS. 2 to 5, FIG. 8 shows schematically the work cycle of the loading apparatus when using a workpiece seesaw.

Figure 1:
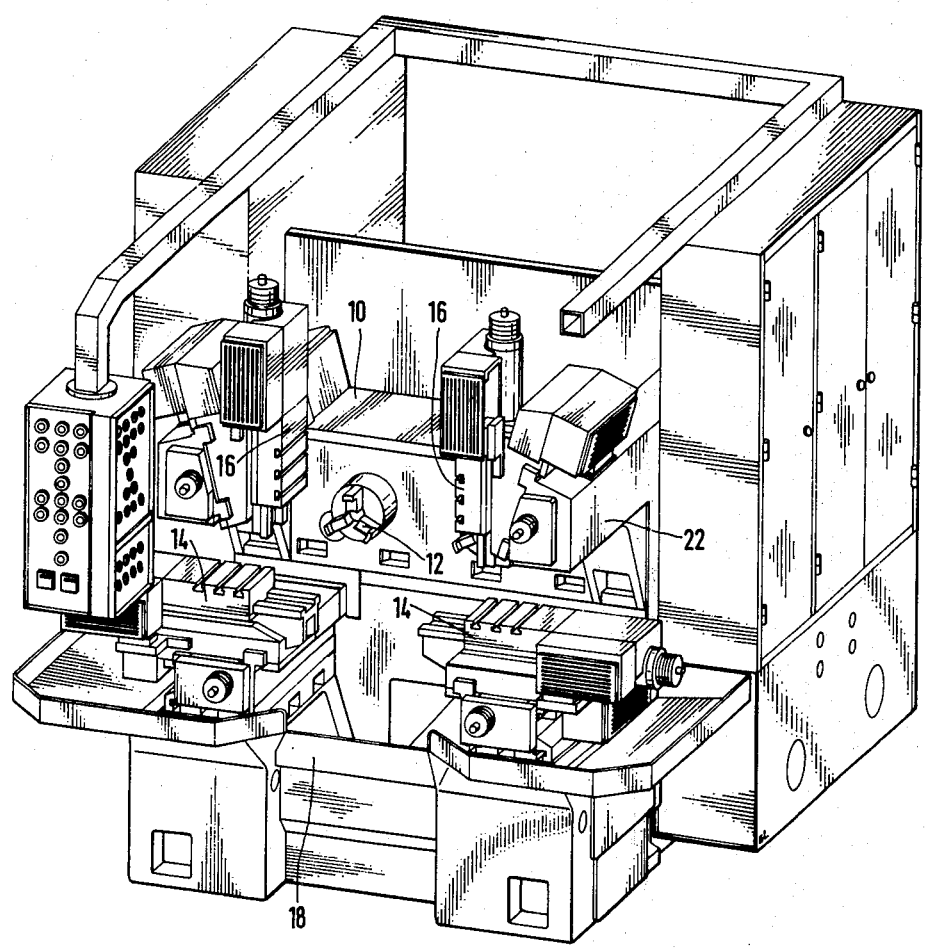
FIG. 1 shows a perspective view of a double-spindle face lathe, on which the loading apparatus according to the invention can be used.

FIG. 1 illustrates a double-spindle face lathe which can be equipped with an automatic loading apparatus according to the invention. Since this is a known lathe, no detailed description of its construction will be given. The lathe has two spindles which are mounted in the double head stock 10 and each carry a chuck 12 on the front side of the lathe. A lower horizontally guided slide 14 and an upper vertically guided slide 16 for the machining tools are associated with each spindle. A swarf collector shaft 18 is placed beneath the chuck 12.

Figure 2:
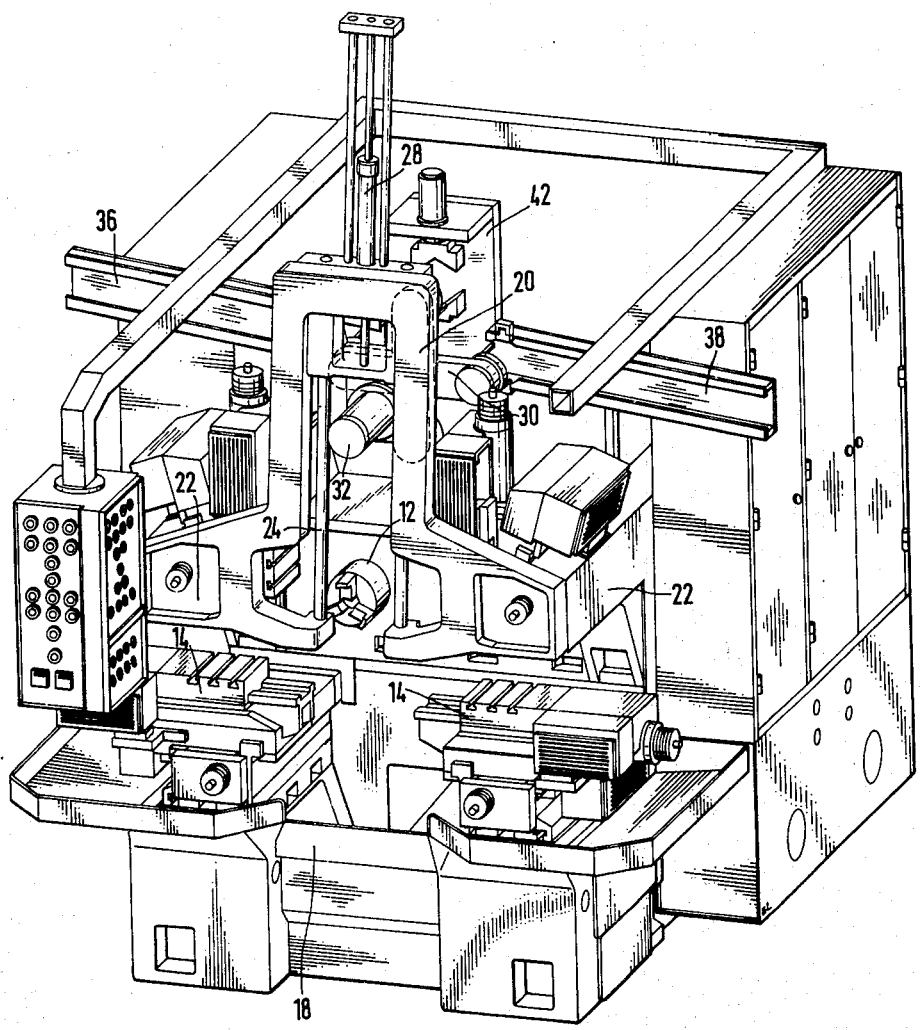
FIG. 2 shows the lathe according to FIG. 1 with a loading apparatus according to the invention which exhibits a turning station.
Figure 3:
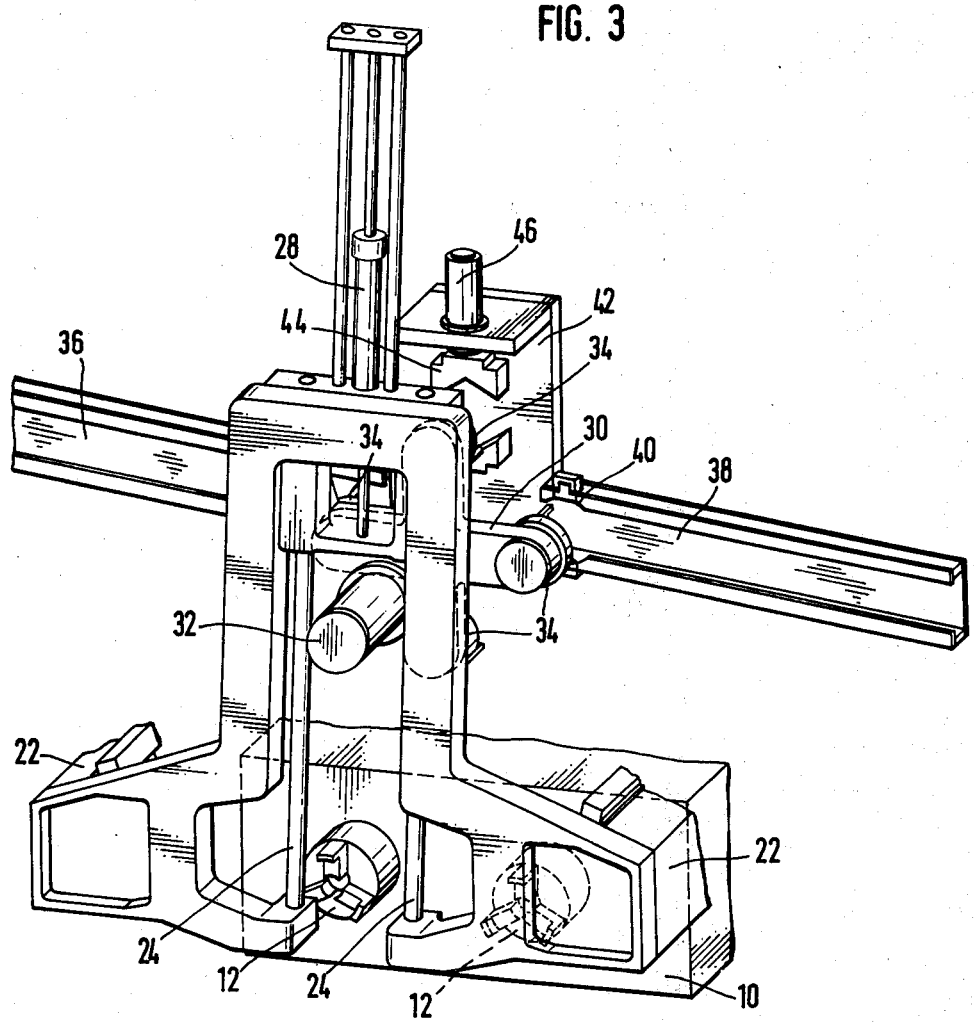
FIG. 3 illustrates the loading apparatus of FIG. 2 in a large scale perspective view.

The loading apparatus illustrated in perspective in FIG. 3 is rigidly attached to the lathe, in as much as a magazine device bracket 20 of the loading apparatus is attached firmly to the two upper slide brackets 22, as may be seen from FIG. 2. The magazine device bracket 20, which is mounted substantially vertically on the lathe, has two vertical circular guides 24 on which a loading carriage 26 is slidable. The vertical sliding of the loading carriage 26 is controlled by a tandem stroke cylinder 28 which is mounted on the magazine device bracket 20 at the top. The loading carriage 26 carries a loading spider 30 oriented in a vertical plane. This loading spider is slidable in the direction of its median axis, i.e. in the horizontal direction, and pivotable through 90° about this median axis, i.e. in its vertical plane, by a lifting and pivoting drive 32 firmly connected to the loading carriage. The four rigidly interconnected arms of the loading spider 30 each carry at their front end a workpiece gripper 34 which faces towards the lathe.

Figure 4:
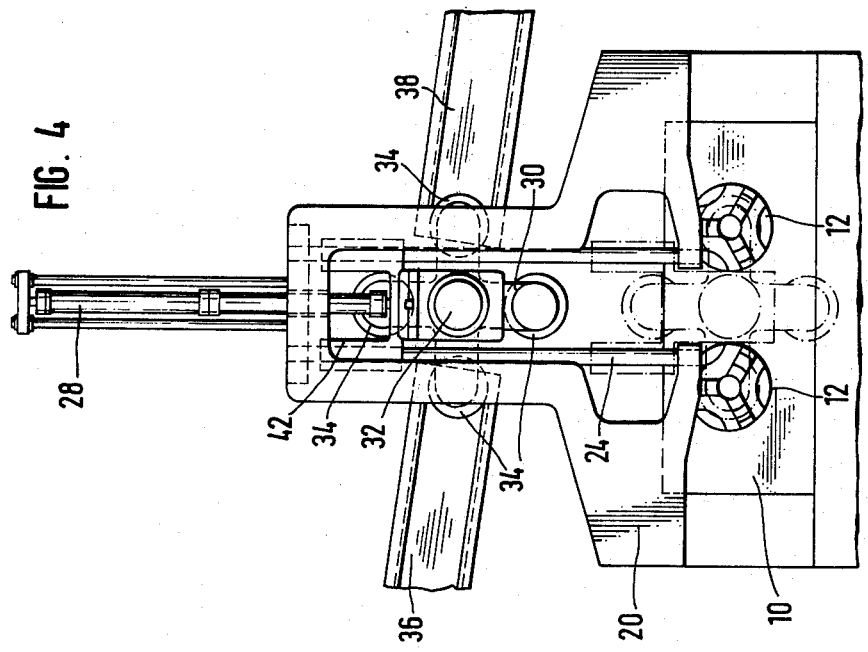
FIG. 4 shows an elevation of the loading apparatus.

At the height of the top limit position of the loading spider 30 a workpiece feed chute 36 is arranged on the one side of the loading apparatus and a workpiece discharge chute 38 on the other side. Both the chutes have a gentle downward gradient in order to transport the circular workpieces. The feed chute 36 has at its end confronting the loading apparatus a removal aperture which is covered in the perspective illustration of FIGS. 2 and 3. The discharge chute 38 has a correspondingly constructed surrender aperture 40 at its end confronting the loading apparatus. The removal and surrender apertures respectively permit an extraction and insertion of the workpieces from and into the respective chute. As will be seen best from FIG. 4, the loading apparatus and the feed chute 36 and the discharge chute 38 are arranged on the lathe in such a way that in the top limit position of the loading carriage 26 and of the loading spider 30 the workpiece grippers 34 on the ends of the horizontal arms of the loading spider 30 are aligned wih the removal aperture and with the surrender aperture 40 respectively. As FIG. 5 shows, by an axial extension of the loading spider 30 in this position these workpiece grippers 34 can therefore penetrate the associated removal or surrender aperture and remove a workpiece from or deposit it in that aperture.

In the bottom limit position of the loading carriage 26 and of the loading spider 30, the workpiece grippers 34 of the horizontal arms of the loading spider are aligned with the chucks 12. As indicated by chain dotted lines in FIG. 5, in this position by an axial extension of the loadng spider 30, workpieces can be transferred from the loading spider to the chuck 12 or removed from the chucks by the loading spider.

Figure 5:
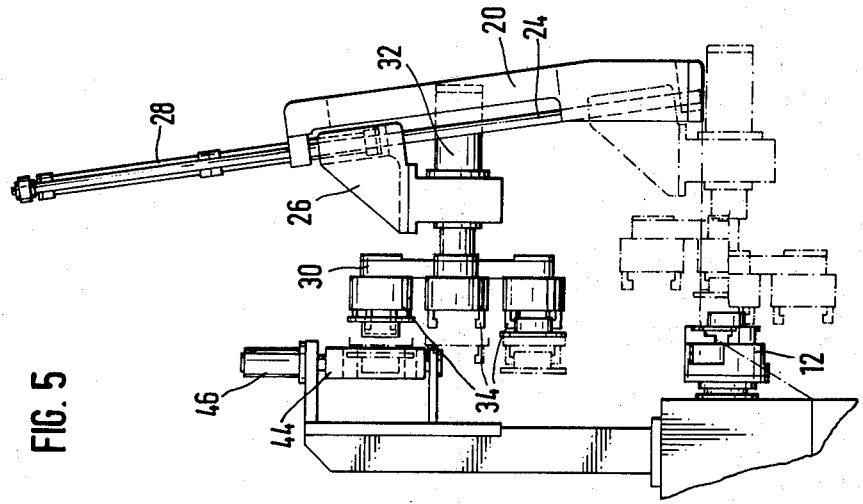
FIG. 5 shows a side elevation of the loading apparatus.

As may be seen from FIG. 5, the magazine device bracket 20 and the circular guides 24 are inclined slightly with reference to the vertical plane. The loading carriage 26 is constructed so that the axial advance of the loading spider 30 occurs precisely in the horizontal direction in spite of this inclination of the circular guides 24. The reason for this inclined arrangement of the magazine device bracket 20 is that the feed and discharge chutes are not arranged in the same vertical plane as the chucks 12 of the work spindles, as may be seen in FIG. 5. The reason for this, as already mentioned, is the space requirements of the top machining slides 16. Due to the oblique arrangement of the magazine device bracket 20 and of the circular guides 24, the axial stroke of the loading spider 30 which is required in the top limit position for the penetration into the feed and discharge chute respectively, is equal to the axial stroke which is required in the bottom limit position of the loading spider for the transfer and surrender of the workpieces into and out of the chucks 12. The construction and control of the lifting drive 32 is considerably simplified by this equal length of the axial stroke of the loading spider 30 in the bottom and top limit positions.

The loading spider 30 is pivotable through 90° about its central axis with the aid of the drive 32, so that the vertical arm of the spider 30 attains the horizontal position and vice versa.

A turning station 42 is arranged at the top limit position of the loading spider 30, as will best be seen in FIGS. 3 and 5. The turning station 42 exhibits a top and a bottom clamping prism 44 by which a workpiece can be gripped. The clamping prisms 44 can be rotated through 180° by a turning drive 46 so that a workpiece gripped by the clamping prisms is turned through 180°. The turning station 42 is arranged so that the clamping prisms 44 are aligned with the workpiece gripper 34 on the vertically upstanding arm of the loading spider 30 when the loading spider occupies its top limit position. In this way it is possible, in the extended state of the loading spider 30, for a workpiece to be transferred by the latter to the turning station 42 or removed therefrom.

The workpiece grippers 34 on the arms of the loading spider 30 may be operable, e.g. by oil hydraulic force.

The principle of operation of the loading apparatus of FIGS. 2 to 5 will now be described with reference to the schematic illustration of FIG. 7, for the case that one workpiece is first machined at its one end by the first spindle and is then transferred to the second spindle and machined there at its other end.

Figure 7A:
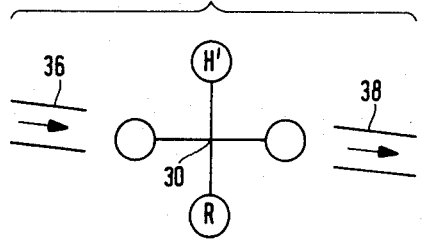
FIG. 7 shows schematically the work cycle of the loading apparatus when using a turning station.
Figure 7B:
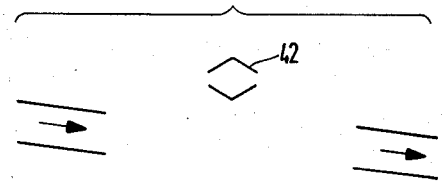
Figure 7C:
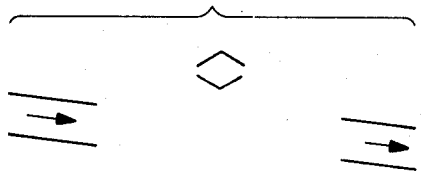

Starting from the state illustrated in FIG. 7a. A blank part has been machined on the first spindle A and is now present as a semi-finished part H in the chuck 12 of the spindle A. A semi-finished part has been completely machined at its other end on the spindle B and is now present as a finished part F in the chuck 12 of the spindle B. The loading spider 30 occupies its top limit position, the workpiece grippers 34 of its horizontal arms are empty, whilst the workpiece gripper 34 of the vertically upstanding arm holds a semi-finished part H' which has already been turned by the turning station and the workpiece gripper 34 of the vertically downward pointing arm contains an unmachined blank part R. The loading carriage 26 now travels downwards into the position illustrated in FIG. 7b. The loading spider 30 is extended axially and the two empty workpiece grippers of the loading spider remove the semi-finished part H from the chuck of the spindle A and the finished part F from the chuck of the spindle B. The loading spider is then retracted axially and is pivoted through 90° so that it assumes the position illustrated in FIG. 7c. The loading spider is then extended axially once more and the blank part R is transferred to the chuck of the spindle A and the turned semi-finished part H' to the chuck of the spindle B.

Figure 7D:
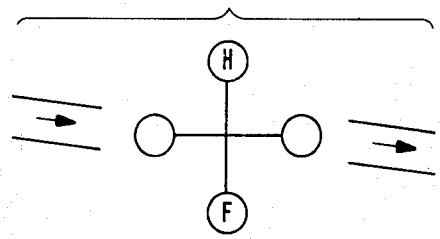
Figure 7E:
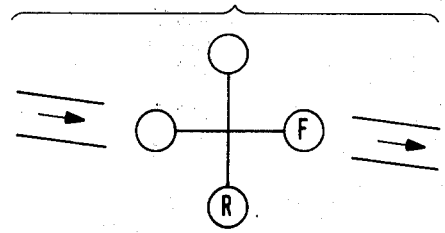

The loading spider 30 is then retracted once more and the loading carriage 26 travels upwards so that the state illustrated in FIG. 7d is reached. The loading spider is now extended axially once more so that the upstanding arm of the loading spider can transfer the semi-finished part H to the turning station 42 and the left-hand horizontal arm can remove a fresh blank part R from the feed chute 36. The loading spider is then retracted axially once more and pivoted through 90' backwards counter clockwise so that it reaches the position illustrated in FIG. 7e. In the meantime the blank part R on the spindle A has been machined into a semi-finished part H and the turned semi-finished part H' on the spindle B has been machined to a finished part F. The loading spider is once more extended axially in the position of FIG. 7e, so that the finished part of the right-hand horizontal arm of the loading spider can be surrendered into the discharge chute 38 and the semi-finished part H' which has in the meantime been turned in the turning staion can be taken by the upstanding arm of the loading spider. The state illustrated in FIG. 7a has thus been reached once more, and the cycle described recommences.

For large workpiece diameters it may occasionally be necessary to give the turning station 42 an additional axial stroke in order to obtain the necessary freedom for pivoting during the turning.

When it is required to perform different lathe machinings to the same workpiece on the spindles A and B without the necessity of turning the workpiece in between, the loading operation proceeds in the same manner as described hereinbefore, but the semi-finished part machined on spindle A and transferred to the turning station is not turned, but is only retained by the turning station and is taken out of the turning station again in the same position after the 90° pivoting movement of the loading spider.

If the workpieces are not required to be machined consecutively first on the spindle A and then on the spindle B, but if two workpieces are required to be machined in the same manner in parallel on spindle A and spindle B each time, then the variant of the loading apparatus illustrated in FIG. 6 may be employed. This embodiment is identical with that previously described, except that the turning station, which is superfluous for this mode of operation, is omitted. Instead, the workpiece holding seesaw illustrated in FIG. 6 is provided in this embodiment.

As illustrated in FIG. 6, in this embodiment the feed chute 36 and the discharge chute 38 respectively terminate before the removal aperture 39 and the surrender aperture 40. These two apertures are present in a workpiece holder seesaw 48 which exhibits the same profile as the feed chute 36 and the discharge chute 38. The seesaw 48 is pivotably mounted and can be tilted e.g. through a lever 50 and a hydraulic drive 52 — into a horizontal position illustrated in FIG. 6 and into an oblique position in which it aligns with and connects the feed chute and the discharge chute. These two positions of the holder seesaw 48 may be determined, e.g. by stops 54 and 56.

A singling device 58 is provided in the feed chute 36 and ensures that the blank parts are fed one at a time to the holder seesaw 48. A blocking bolt 60 is present downstream of the removal aperture 39, and a blocking bolt 62 downstream of the surrender aperture 40, in the feed direction of the workpieces. The blocking bolts 60 and 62 can each be slid controllably into the movement path of the workpieces or removed from the same.

The principle of operation of the holder seesaw 48 is as follows. With the seesaw positioned obliquely, the first blank part in the feed chute 36 is released by the singling device 58, rolls into the seesaw 48 and strikes against the blocking bolt 62 which holds the blank part firmly at the surrender aperture 40. By the striking of the blank part against the blocking bolt 62, an electric contact is tripped which releases the blocking bolt 60 so that the next blank part released by the singling device is firmly held by this blocking bolt 60 at the removal aperture 39. The seesaw 48 is then tilted into the horizontal position in which the blank parts are removed by the loading spider. In corresponding manner the machined finished parts are deposited into the apertures 39 and 40 in the horizontal position of the seesaw 48. The seesaw is then tilted into its oblique position and the blocking bolts 60 and 62 are retracted so that the finished parts can roll into the discharge chute 38.

The principle of operation of the loading apparatus for the parallel machining of two workpieces on the spindles A and B is explained hereinbelow with reference to the schematic illustration in FIG. 8:

In the state illustrated in FIG. 8a, a machined finished part F is present in each of the chucks 12 of the spindles A and B. The top and the bottom arm of the loading spider 30 each carry an unmachined blank part R, whilst the workpiece grippers 34 of the horizontal arms of the loading spider are empty. The loading carriage 26 is transported downwards and the loading spider 30 is extended axially so that the empty workpiece grippers 34 can accept the finished parts F from the chucks 12. Simultaneously two fresh blank parts R can roll into the obliquely positioned holder seesaw 48, so that the state shown in FIG. 8b is reached.

The loading spider 30 is retracted axially and pivoted through 90°. It is then extended axially once more in order to surrender the blank parts R which are carried by the now horizontally positioned arms to the chucks 12 of the spindles A and B, as illustrated in FIG. 8c.

The loading spider 30 is then retracted axially once more, the loading carriage 26 travels upwards with empty workpiece grippers 34 of the horizontal arms of the loading spider in order to remove the fresh blank parts R out of the holder seesaw 48 which has been tilted meanwhile into the horizontal position, as illustrated in FIG. 8d. The loading spider is retracted axially once more with these fresh blank parts and pivoted through 90°. In this position, illustrated in FIG. 8e, the loading spider is extended axially once more, surrenders the finished parts which are carried by the now horizontal arms to the holder seesaw 48, which still occupies the horizontal position. The loading spider 30 is then retracted axially once more and the seesaw 48 is tilted into the oblique position so that the finished parts F are discharged through the discharge chute 38. Since in the meantime the blank parts on the spindles A and B have been machined into finished parts F, the state of FIG. 8a as been reached once more and the work cycle described recommences.

I claim:

1. Automatic loading apparatus for double-spindle face lathes with four machining slides, with a workpiece feed chute for the blank parts and with a workpiece discharge chute for the finished parts, comprising a magazine device bracket attached rigidly to the lathe having a substantially vertical guideway, by a loading carriage slidable on this guideway and by a loading spider which is mounted on the loading carriage with sliding mobility in the direction of its median axis and with 90° pivoting mobility about this axis and exhibits workpiece grippers on each of its four arms, while depending upon the pivotal position of the loading spider the one or the other pair of mutually opposite workpiece grippers are aligned with the spindles when the loading carriage is transported downwards and are aligned with a removal aperture of the workpiece feed chute and with a surrender aperture of the workpiece discharge chute when the loading carriage is transported upwards.

2. Loading apparatus according to claim 1, wherein said magazine device bracket is inclined with reference to a plane extending perpendicularly to the work spindles so that it has the same distance from the chucks of the work spindles and from the removal and surrender apertures or the feed and discharge chutes.

3. Loading apparatus according to claim 1, wherein said loading carriage is slidable on two circular guides fastened to the magazine device bracket by means of a tandem stroke cylinder.

4. Loading apparatus according to claim 1, wherein a turning station is provided for gripping the workpieces and turning them through 180° in a position which corresponds to the position of the workpiece gripper of the vertically upstanding arm of the loading spider when transported upwards.

5. Loading apparatus according to claim 1, wherein said workpiece removal and workpiece discharge apertures are located in a workpiece holder seesaw which is tiltable into a horizontal position and into an oblique position connecting the feed chute and the discharge chute, and that a singling device for the fed workpieces is provided in the feed chute, and that a controllable bolt blocking the movement of the workpieces is arranged downstream of each of the discharge and the surrender apertures in the direction of travel of the workpieces.

6. Loading apparatus according to claim 2, where in said loading carriage is slidable on two circular guides fastened to the magazine device bracket by means of a tandem stroke cylinder.

7. Loading apparatus acording to claim 2, wherein a turning station is provided for gripping the workpieces and turning them through 180° in a position which corresponds to the position of the workpiece gripper of the vertically upstanding arm of the loading spider when transported upwards.

8. Loading apparatus according to claim 3, wherein a turning station is provided for gripping the workpieces and turning them through 180° in a position which corresponds to the position of the workpiece gripper of the vertically upstanding arm of the loading spider when transported upwards.

9. Loading apparatus according to claim 2, wherein said workpiece removal and workpiece discharge apertures are located in a workpiece holder seesaw which is tiltable into a horizontal position and into an oblique position connecting the feed chute and the discharge chute, and that a singling device for the fed workpieces is provided in the feed chute, and that a controllable bolt blocking the movement of the workpieces is arranged downstream of each of the discharge and the surrender apertures in the direction of travel of the workpieces.

10. Loading apparatus according to claim 3, wherein said workpiece removal and workpiece discharge apertures are located in a workpiece holder seesaw which is tiltable into a horizontal position and into an oblique position connecting the feed chute and the discharge chute, and that a singling device for the fed workpieces is provided in the feed chute, and that a controllable bolt blocking the movement of the workpiece is arranged downstream of each of the discharge and the surrender apertures in the direction of travel of the workpieces.

* * * * *